(12) United States Patent
Abeloos et al.

(10) Patent No.: US 12,014,288 B1
(45) Date of Patent: Jun. 18, 2024

(54) METHOD OF AND SYSTEM FOR EXPLAINABILITY FOR LINK PREDICTION IN KNOWLEDGE GRAPH

(71) Applicant: THALES SA, Courbevoie (FR)

(72) Inventors: Baptiste Abeloos, Montreal (CA); Freddy Lecue, Montreal (CA)

(73) Assignee: THALES SA, Courbevoie (FR)

( * ) Notice: Subject to any disclaimer, the term of this patent is extended or adjusted under 35 U.S.C. 154(b) by 848 days.

(21) Appl. No.: 17/130,664

(22) Filed: Dec. 22, 2020

Related U.S. Application Data

(60) Provisional application No. 62/953,133, filed on Dec. 23, 2019.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| 2016/0179945 A1* | 6/2016 | Lastra Diaz | G06F 16/284 |
| | | | 707/739 |
| 2018/0060733 A1* | 3/2018 | Beller | G06N 5/022 |
| 2019/0220524 A1* | 7/2019 | Costabello | G06F 16/24578 |

* cited by examiner

*Primary Examiner* — Dave Misir
(74) *Attorney, Agent, or Firm* — HAUPTMAN HAM, LLP

(57) ABSTRACT

There is provided a method and a system for evaluating a relevance score of a given subset of nodes in a knowledge graph (KG) for purpose of link prediction. An ontology used to generate the KG is obtained and clustered to obtain a set of ontology clusters. A set of vectors having been generated by using an embedding model on the KG is obtained and clustered to obtain a set of vector clusters. Training subgraphs are generated based on the set of ontology clusters and the set of vector clusters by removing subsets of nodes from the KG. Respective prediction models are trained on each training subgraph and ranked based on their link predictions. The relevance score of each removed subset of nodes is determined based on the ranked models. A given subset of nodes is provided as a potential explanation based on the relevance score.

18 Claims, 6 Drawing Sheets

600

```
602 — obtaining an ontology of a knowledge graph, the ontology comprising a set of
ontology nodes and a set of ontology edges having been used to generate the
knowledge graph;

604 — clustering the ontology to obtain a set of ontology clusters, each ontology
cluster comprising a respective subset of ontology nodes and a respective
subset of ontology edges;

606 — obtaining a set of vectors having been generated using the embedding model
on the knowledge graph and being representative of the knowledge graph in
an embedding space;

608 — training the second clustering algorithm on the set of vectors and the
knowledge graph to obtain a set of vector clusters based on a distance
between vectors in the set of vectors, each vector cluster comprising a
respective subset of vectors 610 — generating, based on the knowledge graph and the set of ontology clusters, a
respective training subgraph by removing, from the knowledge graph, a
respective subset of nodes associated with a respective ontology cluster from
the set of ontology clusters;

612 — training a respective embedding model on the respective training subgraph for
providing a link prediction between at least two nodes in the respective
training subgraph 614 — comparing a respective link prediction of each respective trained embedding
model and a corresponding link prediction of the trained second clustering
algorithm to obtain a ranked list of trained embedding models 616 — if the determined quality parameter is above the obtained user feedback
score, providing the trained generative adversarial network
```

Figure 6

METHOD OF AND SYSTEM FOR EXPLAINABILITY FOR LINK PREDICTION IN KNOWLEDGE GRAPH

CROSS-REFERENCE TO RELATED APPLICATIONS

The present application claims priority on U.S. Provisional Patent Application No. 62/953,133 filed on Dec. 23, 2019.

FIELD

The present technology relates to machine learning (ML) models and graph theory in general and more specifically to methods and systems for explaining link predictions performed by a link prediction machine learning model in a knowledge graph.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Knowledge graphs (KGs) have been proven to be useful for real-world application, such as semantic parsing, entity disambiguation, information extraction and question answering. A KG is a multi-relational graph composed of entities represented by nodes and relations, which are represented by different type of edges. A given edge is represented as a triple indicating a type of relation connecting two entities. While KGs are effective in representing structured data, the symbolic nature of how KGs are represented makes them difficult to manipulate.

Following the rise of machine learning, progresses in learning methods enabled improvements in manipulations of knowledge graphs, graph learning, and in particular in learning and predicting new types of relations between entities in knowledge graphs. Several models have been developed to obtain very accurate results in terms of link prediction in knowledge graphs.

However, in some instances, no explanation can be provided by the models which may be a serious limitation for some applications.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that while recent graph link predictions machine learning models provide accurate results, such models do not provide explanations with regard to how the decisions of the graph link prediction models are made, which does not enable validating if the decisions can be trusted.

More specifically, developers have appreciated that in some contexts, such as in reasoning engines and recommendation systems applied in medicine and critical systems, an understanding of the behavior of the graph link prediction models is required to perform actions in consequence to the decisions, i.e. the "thinking" behind the prediction must be validated by an operator or entity before performing the actual action.

Thus, one or more embodiments of the present technology are directed to methods and systems for explainability for link prediction in knowledge graphs.

The present technology aims to combine two approaches for providing explanations for link predictions in a knowledge graph, a first approach based on the ontology used to generate the knowledge graph, and a second approach based on graph embeddings. The two approaches are combined to identify subgraphs of the knowledge graph which have an impact on performance prediction, and may thus provide explanations for link predictions in the knowledge graph. One or more embodiments of the present technology may be used to provide explanation for content recommendation to users, to provide explanations for optimal fuel consumption, and to provide explanations in pathology detection in images acquired using medical imaging modalities (e.g. computational tomography (CT), X-ray, magnetic resonance imaging (MRI), etc.).

In accordance with a broad aspect of the present technology, there is disclosed a method for evaluating a relevance score of a given subset of nodes in a knowledge graph for purpose of link prediction between at least two nodes in the knowledge graph, the method being executed by a processor, the processor having access to a first clustering machine learning (ML) model, a second clustering ML model, and an embedding model having been trained for providing link prediction in the knowledge graph by evaluating a distance between vectors generated from the knowledge graph. The method comprises obtaining an ontology representative of a structure of the knowledge graph, the ontology comprising a set of ontology nodes and a set of ontology edges having been used to generate the knowledge graph. The method comprises clustering, using the first clustering ML model, the ontology to obtain a set of ontology clusters, each ontology cluster comprising a respective subset of ontology nodes and a respective subset of ontology edges, obtaining a set of vectors having been generated using the embedding model on the knowledge graph and being representative of the knowledge graph in an embedding space. The method comprises training the second clustering ML model on the set of vectors and the knowledge graph to obtain a set of vector clusters based on a distance between vectors in the set of vectors, each vector cluster comprising a respective subset of vectors, generating, based on the knowledge graph and the set of ontology clusters, a respective training subgraph by removing, from the knowledge graph, a respective subset of nodes associated with a respective ontology cluster from the set of ontology clusters, training a respective embedding model on the respective training subgraph for providing a link prediction between at least two nodes in the respective training subgraph, comparing a respective link prediction of each respective trained embedding model and a corresponding link prediction of the trained second clustering ML model to obtain a ranked list of trained embedding models. The method comprises determining, based on the ranked list of trained embedding models, a relevance score of each removed respective subset of nodes for providing the respective link prediction in the knowledge graph.

In one or more embodiments of the method, the method further comprises if a given removed subset of nodes has a relevance score above a predetermined threshold providing the given removed subset of nodes as a potential explanation for the respective link prediction.

In one or more embodiments of the method, each ontology cluster in the set of ontology clusters is indicative of a first type of similarity between nodes in the knowledge graph associated with the ontology cluster, and each vector cluster in the set of vector clusters is indicative of a second type of similarity between nodes in the knowledge graph associated with the vector cluster.

In one or more embodiments of the method, the clustering of the ontology comprises clustering the ontology to obtain a set of spectral clusters, and clustering the set of spectral clusters to obtain the set of ontology clusters.

In one or more embodiments of the method, the first clustering ML model comprises a spectral clustering ML model used for obtaining the set of spectral clusters and a k-means clustering ML model used for obtaining the set of ontology clusters.

In one or more embodiments of the method, the second clustering ML model comprises another k-means clustering ML model.

In one or more embodiments of the method, the method further comprises, prior to the training of the second clustering ML model obtaining a set of hyperparameters of the embedding model, and the training of the second clustering ML model is performed using the set of hyperparameters of the embedding model.

In one or more embodiments of the method, the knowledge graph is represented as a set of triples, and the ontology is represented as a set of ontology triples.

In one or more embodiments of the method, the method further comprises, prior to the obtaining of the set of vectors: obtaining the set of triples and generating, using the set of triples, the set of vectors.

In one or more embodiments of the method, the generating of the respective training subgraph comprises generating, from the set of triples, a respective set of training triples.

In accordance with a broad aspect of the present technology, there is disclosed a system for evaluating a relevance score of a given subset of nodes in a knowledge graph for purpose of link prediction between at least two nodes in the knowledge graph, the system comprising a processor, the processor having access to: a first clustering ML model, a second clustering ML model, and an embedding model having been trained for providing link prediction in the knowledge graph by evaluating a distance between vectors generated from the knowledge graph, the processor being operatively connected to a non-transitory storage medium comprising instructions, the processor, upon executing the instructions, being configured for obtaining an ontology representative of a structure of the knowledge graph, the ontology comprising a set of ontology nodes and a set of ontology edges having been used to generate the knowledge graph. The processor is configured for clustering, using the first clustering ML model, the ontology to obtain a set of ontology clusters, each ontology cluster comprising a respective subset of ontology nodes and a respective subset of ontology edges, obtaining a set of vectors having been generated using the embedding model on the knowledge graph and being representative of the knowledge graph in an embedding space. The processor is configured for training the second clustering ML model on the set of vectors and the knowledge graph to obtain a set of vector clusters based on a distance between vectors in the set of vectors, each vector cluster comprising a respective subset of vectors, generating, based on the knowledge graph and the set of ontology clusters, a respective training subgraph by removing, from the knowledge graph, a respective subset of nodes associated with a respective ontology cluster from the set of ontology clusters, training a respective embedding model on the respective training subgraph for providing a link prediction between at least two nodes in the respective training subgraph, comparing a respective link prediction of each respective trained embedding model and a corresponding link prediction of the trained second clustering ML model to obtain a ranked list of trained embedding models. The processor is configured for determining, based on the ranked list of trained embedding models, a relevance score of each removed respective subset of nodes for providing the respective link prediction in the knowledge graph.

In one or more embodiments of the system, the processor is further configured for if a given removed subset of nodes has a relevance score above a predetermined threshold providing the given removed subset of nodes as a potential explanation for the respective link prediction.

In one or more embodiments of the system, each ontology cluster in the set of ontology clusters is indicative of a first type of similarity between nodes in the knowledge graph associated with the ontology cluster, and each vector cluster in the set of vector clusters is indicative of a second type of similarity between nodes in the knowledge graph associated with the vector cluster.

In one or more embodiments of the system, the clustering of the ontology comprises clustering the ontology to obtain a set of spectral clusters, and clustering the set of spectral clusters to obtain the set of ontology clusters.

In one or more embodiments of the system, the first clustering ML model comprises a spectral clustering ML model used for obtaining the set of spectral clusters and a k-means clustering ML model used for obtaining the set of ontology clusters.

In one or more embodiments of the system, the second clustering ML model comprises another k-means clustering ML model.

In one or more embodiments of the system, the method further comprises, prior to the training of the second clustering ML model: obtaining a set of hyperparameters of the embedding model, and the training of the second clustering ML model is performed using the set of hyperparameters of the embedding model.

In one or more embodiments of the system, the knowledge graph is represented as a set of triples and the ontology is represented as a set of ontology triples.

In one or more embodiments of the system, the processor is further configured for, prior to the obtaining of the set of vectors, obtaining the set of triples and generating, using the set of triples, the set of vectors.

In one or more embodiments of the system, the generating of the respective training subgraph comprises generating, from the set of triples, a respective set of training triples.

Definitions

Graph

Graphs are mathematical structures used to model pairwise relations between objects. A graph is composed of vertices (also known as nodes or points) which are connected by edges (also known as links or lines). A graph may be a directed graph, where edges have an associated direction, or an undirected graph where edges do not have an associated direction.

Machine Learning (ML) Models

A machine learning algorithm (MLA) is a process or sets of procedures that helps a mathematical model adapt to data given an objective. A ML algorithm normally specifies the way the feedback is used to enable the model to learn the appropriate mapping from input to output. The model specifies the mapping function and holds the parameters while the learning algorithm updates the parameters to help the model satisfy the objective.

Machine learning may generally be divided into broad categories such as supervised learning, unsupervised learning and reinforcement learning. Supervised learning involves presenting a machine learning algorithm with training data consisting of inputs and outputs labelled by assessors, where the objective is to train the machine learning algorithm such that it learns a general rule for mapping inputs to outputs. Unsupervised learning involves presenting the machine learning algorithm with unlabeled data, where the objective for the machine learning algorithm is to find a structure or hidden patterns in the data. Reinforcement learning involves having an algorithm evolving in a dynamic environment guided only by positive or negative reinforcement.

Non-limiting examples of models used by the MLAs include neural networks (including deep learning (DL) neural network), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, hopfield networks.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data en route from input to output).

Gradient Boosting

Gradient boosting is one approach to building models based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the MLA first builds a first tree, then a second tree, which enhances the prediction outcome of the first tree, then a third tree, which enhances the prediction outcome of the first two trees and so on. Thus, the MLA in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Examples of deep learning MLAs include: Deep Boltzmann Machine (DBM), Deep Belief Networks (DBN), Convolutional Neural Network (CNN), and Stacked Auto-Encoders.

Examples of ensemble ML models include: Random Forest, Gradient Boosting Machines (GBM), Boosting, Bootstrapped Aggregation (Bagging), AdaBoost, Stacked Generalization (Blending), and Gradient Boosted Regression Trees (GBRD).

Examples of NN ML models include: Radial Basis Function Network (RBFN), Perceptron, Back-Propagation, and Hopfield Network Examples of Regularization ML models include: Ridge Regression, Least Absolute Shrinkage and Selection Operator (LASSO), Elastic Net, and Least Angle Regression (LARS).

Examples of Rule system ML models include: Cubist, One Rule (OneR), Zero Rule (ZeroR), and Repeated Incremental Pruning to Produce Error Reduction (RIPPER).

Examples of Regression ML models include: Linear Regression, Ordinary Least Squares Regression (OLSR), Stepwise Regression, Multivariate Adaptive Regression Splines (MARS), Locally Estimated Scatterplot Smoothing (LOESS), and Logistic Regression.

Examples of Bayesian ML models include: Naive Bayes, Averaged One-Dependence Estimators (AODE), Bayesian Belief Network (BBN), Gaussian Naive Bayes, Multinomial Naive Bayes, and Bayesian Network (BN).

Examples of Decision Trees ML models include: Classification and Regression Tree (CARD), Iterative Dichotomiser 3 (103), C4.5, C5.0, Chi-squared Automatic Interaction Detection CCHAID), Decision Stump, Conditional Decision Trees, and M5.

Examples of Dimensionality Reduction ML models include: Principal Component Analysis (PCA), Partial Least Squares Regression (PLSR), Sammon Mapping, Multidimensional Scaling (MDS), Projection Pursuit, Principal Component Regression (PCR), Partial Least Squares Discriminant Analysis, Mixture Discriminant Analysis (MDA), Quadratic Discriminant Analysis (QDA), Regularized Discriminant Analysis (RDA), Flexible Discriminant Analysis (FDA), and Linear Discriminant Analysis (LOA).

Examples of Instance Based ML models include: k-Nearest Neighbour (kNN), Learning Vector Quantization (LVQ), Self-Organizing Map (SOM), Locally Weighted Learning (LWL).

Examples of Clustering ML models include: k-Means, k-Medians, Expectation Maximization, and Hierarchical Clustering.

In the context of the present specification, the terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the present technology," unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 depicts a flow chart of a method of evaluating relevance score of a given subset of nodes in a knowledge graph for the purpose of link prediction in accordance with one or more non-limiting embodiments of the present technology.

DETAILED DESCRIPTION

Figure 1:
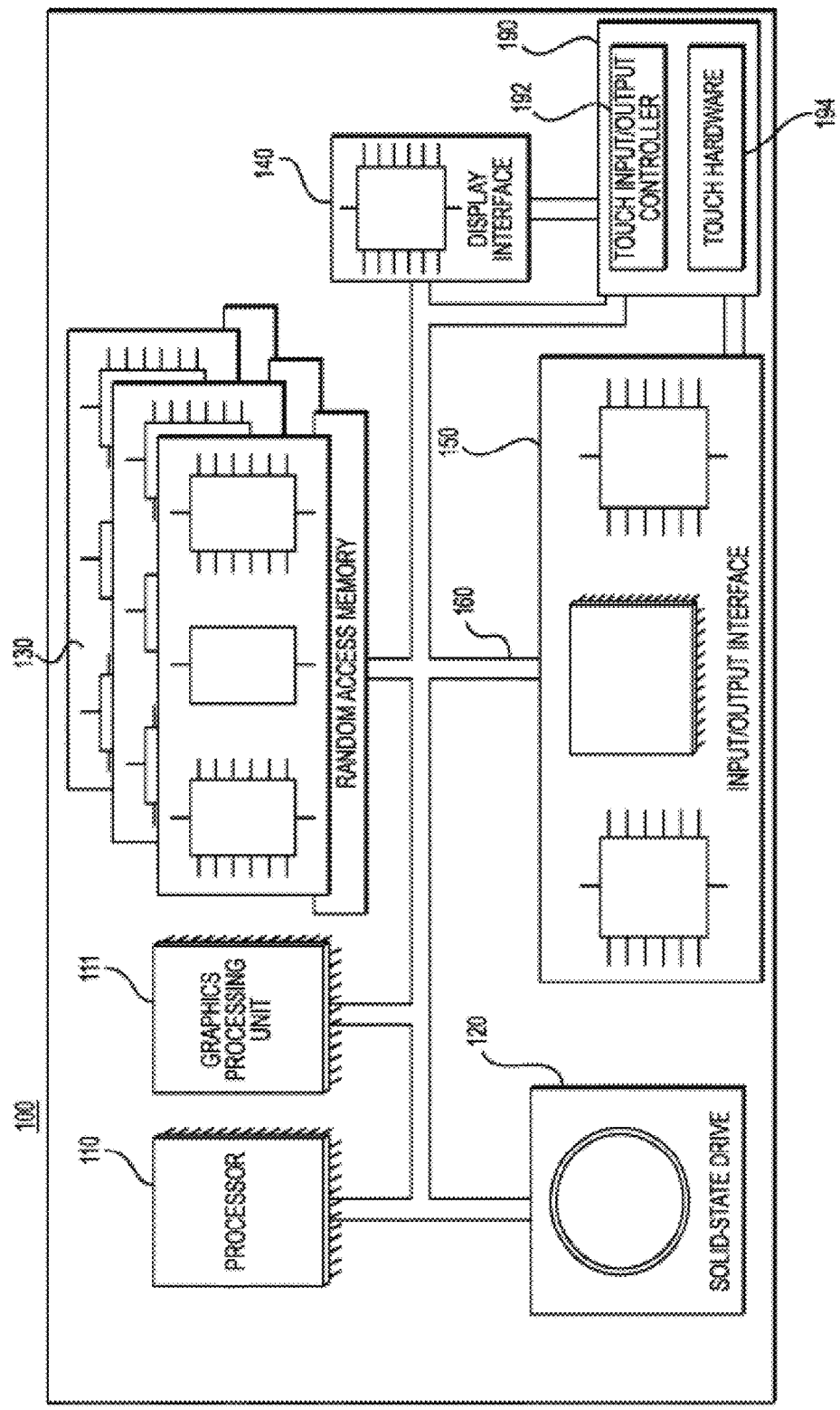
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, some non-limiting examples will now be considered to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for link prediction explainability in the knowledge graph. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
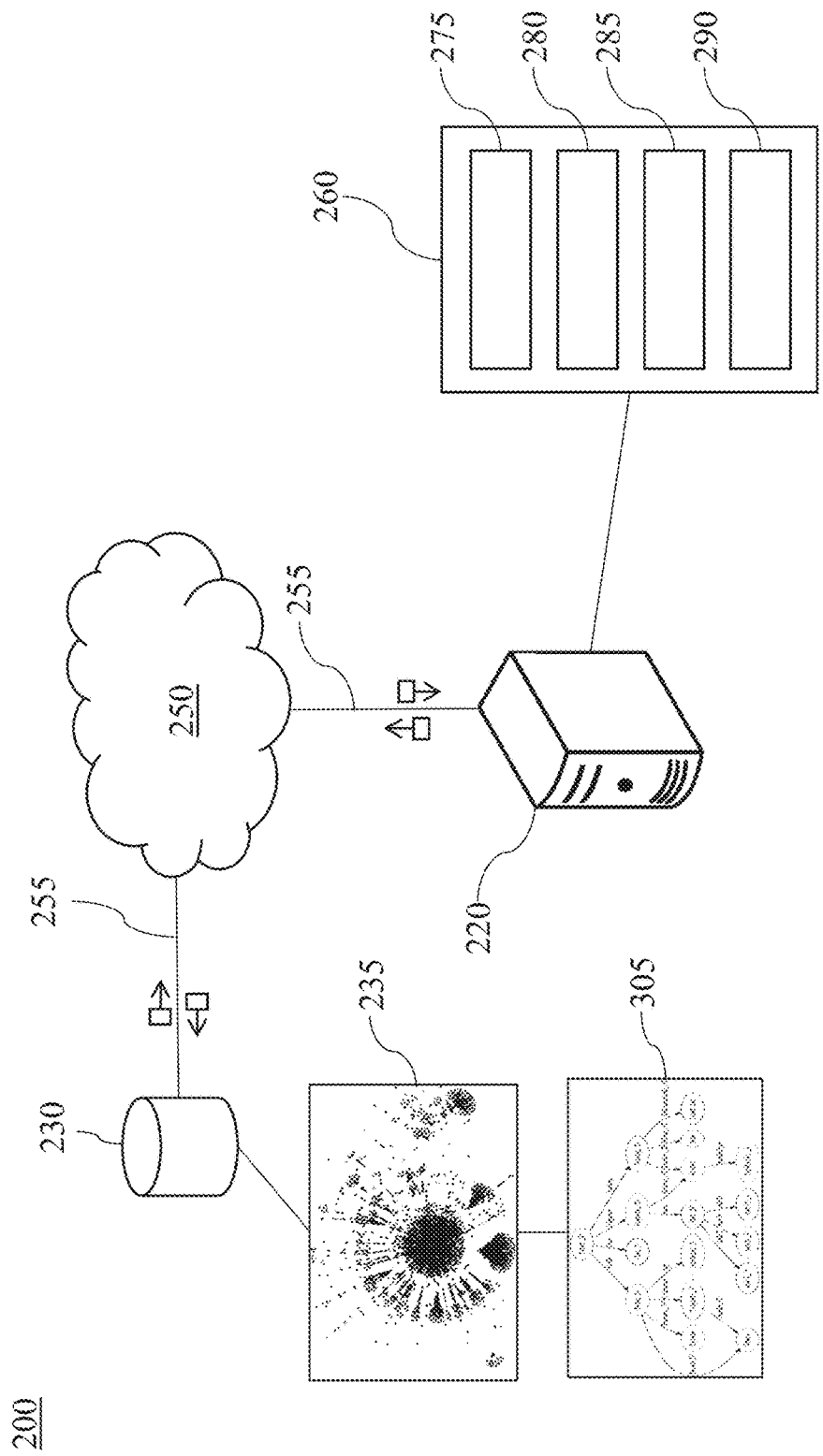
FIG. 2 depicts a schematic diagram of a system in accordance with one or more non-limiting embodiments of the present technology.

Now referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 220, and a database 230, communicatively coupled over a communications network 250 via respective communication links 255.

Server

The server 220 is configured to inter alia: (i) access a plurality of machine learning (ML) models 260; (ii) access a knowledge graph 235; (iii) obtain an ontology of the knowledge graph 235 to generate a set of ontology clusters using one or more of the plurality of ML models 260; (iv) obtain an embedding of the knowledge graph 235 and generates a set of clusters from the embedding by using one or more of the plurality of ML models 260; (v) generate training datasets based on a combination the set of ontology clusters and set of clusters from the embedding; (vi) train one more of the plurality of ML models 260 on each training dataset for the purpose of link prediction and for ranking the training datasets.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a Dell™ PowerEdge™ Server running the Microsoft™ Windows Server™ operating system. Needless to say that the server 220 may be implemented in any other suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The server 220 comprises a communication interface (not shown) configured to communicate with various entities (such as the database 230, for example and other devices potentially coupled to the communication network 250) via the network. The server 220 further comprises at least one computer processor (e.g., the processor 110 or the GPU 111 of the electronic device 100) operationally connected with the communication interface and structured and configured to execute various processes to be described herein.

Plurality of Machine Learning (ML) Models

The server 220 has access to a plurality of ML models 260.

The plurality of ML models 260 includes inter alia a KG embedding ML model 270, a KG link prediction ML model 275, a spectral clustering ML model 280, a k-means clustering ML model 285, and an embedding clustering ML model 290.

The KG embedding ML model 270 is configured to generate embeddings of a knowledge graph 235 stored in the database 230. The KG embedding ML model 270 encodes entities and relations of the knowledge graph 235 in a continuous low-dimensional vector space or embedding space so as to perform various machine learning tasks. As a non-limiting example, the knowledge graph 235 may be encoded by the KG embedding ML model 270 as a set of vectors, a matrix, or a tensor.

It will be appreciated that in one or more other embodiments, the KG embedding ML model 270 may represent different substructures of the knowledge graph 235, i.e. a given vector may represent one of a node, edge, subgraph of the knowledge graph 235. In one or more alternative embodiments, the KG embedding ML model 270 may be trained to embed knowledge graphs using word embedding techniques.

In one or more embodiments, the KG embedding ML model 270 is a deep learning model. Additionally, the KG embedding ML model 270 may comprise one or more convolutional neural networks (CNNs) to perform KG encoding. It will be appreciated that the KG embedding model 270 may be trained using techniques such as, but not limited to back-propagation and gradient descent.

The KG link prediction ML model 275 is configured to perform link predictions in a knowledge graph. KG link prediction, which is also known as knowledge graph completion, aims to automatically infer missing facts based on existing facts in the KG, e.g. predict missing links between entities in a KG based on known links.

The KG link prediction ML model 275 is configured to perform link predictions in the knowledge graph 235 by performing one or more of: (i) predicting a head entity given a relation and a tail entity in the KG 235; (ii) predicting a tail entity given a relation and a head entity in the KG 235. In one or more embodiments, the KG link prediction ML model 275 is configured to predict a relation between a given head entity and given tail entity in the KG 235.

The KG link prediction ML model 275 may perform link predictions by learning entity and relation representations, and then performing a ranking procedure by calculating a score for each possible triple. In one or more embodiments, the KG link prediction ML model 275 is trained by learning KG embeddings generated by the KG embedding ML model 270, and ranking link predictions based on the learned KG embeddings.

In one or more embodiments, the KG link prediction ML model 275 is a deep neural network (DNN), also known as deep learning model.

In one or more embodiments, the KG link prediction ML model 275 and the KG embedding ML model 270 may be combined into a single ML model which generates KG embeddings and performs link predictions based on the generated embeddings.

The spectral clustering ML model 280 is configured to perform graph-based spectral clustering to divide data points into several groups or clusters such that points in the same group are similar to each other and points in different groups are dissimilar to each other. The spectral clustering ML model 280 is configured to compute a similarity graph of objects to clusters, compute the first k eigenvector of its Laplacian matrix to define a feature vector for each object, and run k-means clustering on the features to separate objects into k classes. The Laplacian matrix is computed based on an adjacency matrix.

In one or more embodiments, the spectral clustering ML model 280 is configured to compute the similarity graph based on the fully connected graph. In one or more other embodiments of the present technology, the spectral clustering ML model 280 is configured to compute the similarity graph based on k-nearest neighbors.

The k-means clustering ML model 285 is configured to partition n observations into k clusters in which each observation belongs to the cluster with the nearest mean, serving as a prototype of the cluster. In the context of the present technology, the k-means clustering ML model 285 may be applied on one or more of the ontology 305 of the knowledge graph 235, the knowledge graph 235, and the embeddings or vectors of the knowledge graph 235.

The embedding clustering ML model 290 is configured to perform clustering of the embeddings of the knowledge graph 235. How the embedding clustering ML model 290 is configured to do so will be explained in more detail herein below with reference to FIG. 3.

In one or more embodiments, the server 220 may execute one or more of the plurality of ML models 260. In another embodiment, one or more the plurality of ML models 260 may be executed by another server (not depicted), and the server 220 may access the one or more of the plurality of ML models 260 for training or for use by connecting to the server (not shown) via an API (not depicted), and specify parameters of the one or more of the plurality of MLAs, transmit data to and/or receive data from the one or more of the plurality of ML models 260, without directly executing the one or more of the plurality of ML models 260.

As a non-limiting example, one or more of the plurality of ML models 260 may be hosted on a cloud service providing a machine learning API. Non-limiting examples of such services include Amazon™ machine learning API, BigML™, PredictionIO™, Google Cloud™ API, IBM™ Watson™ Discovery API, Kairos™ API, Microsoft™ Azure™ Cognitive Services, Prediction™ IO, and TensorFlow™ API.

Database

A database 230 is communicatively coupled to the server 220 via the communications network 250 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on a separate hardware, such as on the server 220. The database 230 may receive data from the server 220 for storage thereof and may provide stored data to the server 220 for use thereof.

In one or more embodiments of the present technology, the database 230 is configured to inter alia: (i) store the knowledge graph 235; (ii) store the ontology 305 of the knowledge graph 235; (iii) store a set of partial ontologies generated based on the ontology 305 of the knowledge graph 235; (iv) store training datasets generated based on the partial ontologies; and (v) store results of respective predictions performed by a ML model trained on the training datasets.

The database 230 stores the knowledge graph 235, which is a representation of information in the form of a graph. The knowledge graph 235 is a directed graph whose nodes are entities and edges are subject-property-object triple facts. Each edge is represented in the form of a triple (head entity h, relation r, tail entity t) where each edge indicates a relation r from entity h to entity t. Each node belongs to one particular type of a set of node types, and each edge belongs to one particular type of a set of edge types. It will be appreciated that there may be a plurality of edge types and/or a plurality of node types depending on implementations of the present technology.

In one or more embodiments, the database 230 stores the knowledge graph 235 in the form of a set of KG triples, which will also be referred to as the full training dataset of KG triples.

The database 230 stores the ontology 305 of the knowledge graph 235, which has been used to generate the knowledge graph 235. The ontology 305 of the knowledge graph 235 describes a relation between the node types and the edge types in the knowledge graph 235.

In one or more embodiments, the database 230 stores the ontology 305 of the knowledge graph 235 in the form of a set of ontology triples, where each ontology triple comprises a head ontology node, a tail ontology node, and a relation between the head ontology node and the tail ontology node.

Communication Network

In one or more embodiments of the present technology, the communications network 250 is the Internet. In one or more alternative non-limiting embodiments, the communication network 250 may be implemented as any suitable local area network (LAN), wide area network (WAN), a private communication network or the like. It will be appreciated that implementations for the communication network 250 are for illustration purposes only. How a communication link 255 (not separately numbered) between the server 220, the database 230, and/or another electronic device (not shown) and the communications network 250 is implemented will depend inter alia on how each electronic device in the system 200 is implemented.

Explainable Link Prediction

Figure 3:
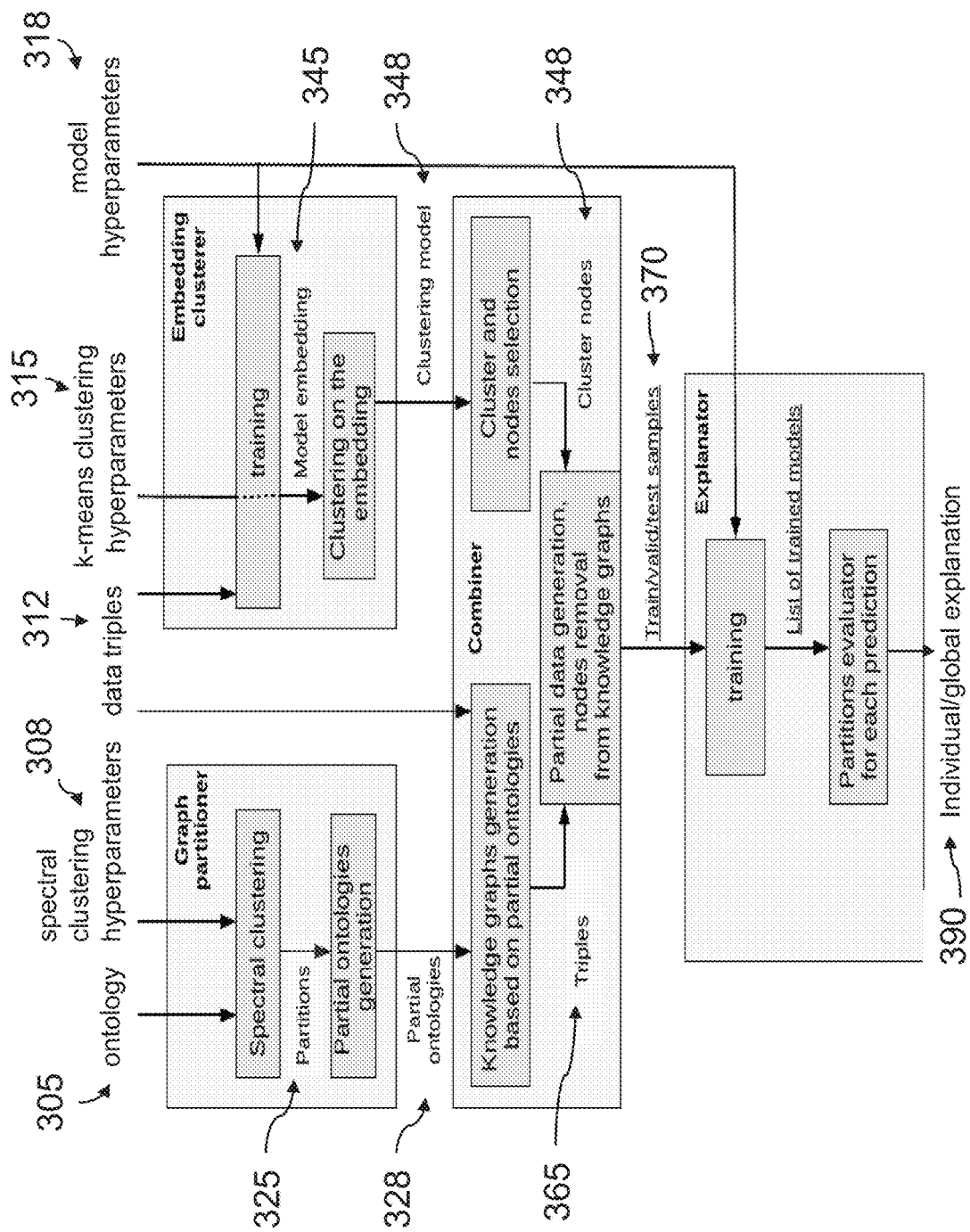
FIG. 3 depicts a schematic diagram of an explainable link prediction generation procedure in accordance with one or more non-limiting embodiments of the present technology.

With reference to FIG. 3, there is shown a schematic diagram of an explainable link prediction generation procedure 300 in accordance with one or more non-limiting embodiments of the present technology.

The purpose of the explainable link prediction generation procedure 300 is to combine two approaches for providing explanations for link predictions in the knowledge graph 235, a first approach based on the ontology 305 used to generate the knowledge graph 235, and a second approach based on graph embeddings of the knowledge graph 235. The two approaches are combined to identify subgraphs of the knowledge graph 235 which have a quantifiable impact or influence on performance of link prediction, and may thus provide potential explanations for link predictions in the knowledge graph 235.

The explainable link prediction generation procedure 300 comprises inter alia a graph partitioning procedure 320, an embedding clustering procedure 340, a combination procedure 360, and an explanation procedure 380.

In one or more embodiments of the present technology, the server 220 executes the explainable link prediction generation procedure 300. In alternative embodiments, the server 220 may execute at least a portion of the explainable link prediction generation procedure 300, and one or more other servers (not shown) may execute other portions of the explainable link prediction generation procedure.

Graph Partitioning

The graph partitioning procedure 320 is configured to inter alia: (i) obtain an ontology 305 of the knowledge graph 235; (ii) perform a spectral clustering on the ontology 305 to obtain a set of ontology clusters 325; and (iii) generate a set of partial ontologies 328 based on the set of ontology clusters 325.

The graph partitioning procedure 320 obtains the ontology 305 of the knowledge graph 235. The ontology 305 of the knowledge graph 235 is represented as a set of ontology nodes corresponding to node types in the knowledge graph 235, connected by a set of ontology edges, corresponding to edge types in the knowledge graph 235. In one or more embodiments, the ontology 305 is represented as a set of ontology triples.

The ontology 305 of the knowledge graph 235 describes a relation between the node types and the edge types in the knowledge graph 235.

The graph partitioning procedure 320 has access to the spectral clustering ML model 280.

The graph partitioning procedure 320 executes the spectral clustering ML model 280 using the set of spectral clustering hyperparameters 308 on the knowledge graph 235 to obtain a set of ontology clusters 325, where each ontology cluster includes a respective subgraph of the ontology 305 i.e., a subset of ontology nodes connected by a respective subset of ontology edges. In other words, each ontology cluster includes a respective subset of ontology triples.

The graph partitioning procedure 320 executes the spectral clustering ML model 280 such that connectivity of the ontology nodes inside each respective ontology cluster is maximized, and connectivity between the ontology clusters is minimized, i.e., there is a maximal number of ontology edges between ontology nodes in a given ontology cluster, and a minimal number of ontology edges connecting each ontology cluster of the set of ontology clusters 325.

To obtain the set of ontology clusters 325, the spectral clustering ML model 280 generates an affinity matrix of the ontology 305, where each of the rows and columns represent the set of ontology nodes of the ontology 305, and elements of the matrix represent presence or absence of edges between the ontology nodes. The spectral clustering ML model 280 calculates the Laplacian matrix and obtains the eigenvalues before obtaining the set of ontology clusters 325.

The spectral clustering ML model 280 uses a set of spectral clustering hyperparameters 308 to perform spectral clustering. In one or more embodiments, the set of spectral clustering hyperparameters 8308 comprises: a number of spectral clusters (i.e. a number of edges between clusters), a number of edges within clusters, and a strategy for using an assigned label.

During spectral clustering, a number of iterations should be chosen to be sufficiently high for convergence. As a non-limiting example, the number of clusters in the set of ontology clusters 325 may be predetermined to be six (6).

In one or more embodiments, the graph partitioning procedure 320 executes the k-means clustering ML model 285 after execution of the spectral clustering ML model 280 to obtain the set of ontology clusters 325. Each ontology cluster in the set of ontology clusters 325 is indicative of a first type of similarity between ontology nodes in the ontology cluster. The set of ontology clusters 325 may be used to perform link predictions in the knowledge graph 325.

Figure 4:
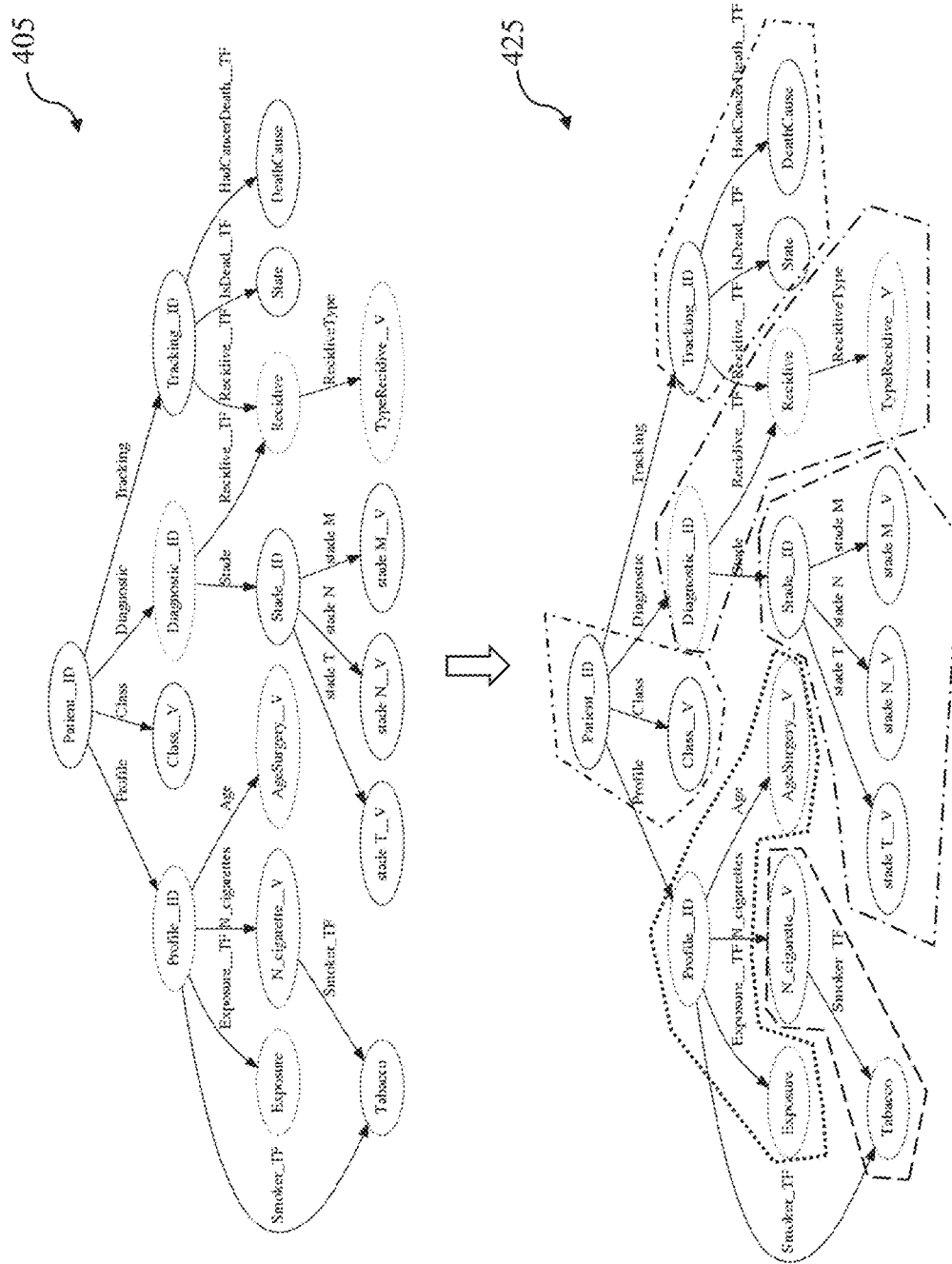
FIG. 4 depicts a schematic diagram of an ontology of a knowledge graph and a set of ontology clusters generated using spectral clustering thereon in accordance with one or more non-limiting embodiments of the present technology.

With brief reference to FIG. 4, there is depicted in accordance with one or more non-limiting embodiments of the present technology, a non-limiting example of the ontology 305 in the form of the medical ontology 400 and the set of ontology clusters 325 in the form of the set of the medical ontology clusters 425 generated by the graph partitioning procedure 320. The set of medical ontology clusters 425 comprises 6 ontology clusters.

Now referring back to FIG. 3, after performing the spectral clustering on the ontology 305 of the knowledge graph 235, the graph partitioning procedure 320 is configured to generate the set of partial ontologies 328 based on the set of ontology clusters 325.

The graph partitioning procedure 320 generates each partial ontology in the set of partial ontologies 328 by removing, from the set of ontology clusters 325, one or more ontology clusters, which will be referred to as a respective removed ontology clusters or respective removed ontology subgraphs. Thus, each partial ontology in the set of partial ontologies 328 includes at least a respective subset of the set of ontology clusters 325, and is associated with respective removed ontology clusters. It will be appreciated that each removed ontology contains one or more of the predictions to be tested by the KG link prediction ML model 275 and requires to be connected.

In one or more alternative embodiments, the graph partitioning procedure 320 may remove nodes instead of clusters from the set of ontology clusters 325 to generate the set of partial ontologies 328.

As a non-limiting example, the graph partitioning procedure 320 may generate a set of ontology clusters 325 including six (6) ontology clusters, and generate a set of partial ontologies 328 comprising seventeen (17) partial ontologies.

The graph partitioning procedure 320 outputs the set of partial ontologies 328.

Embedding Clustering

The embedding clustering procedure 340 is configured to inter alia: (i) obtain the knowledge graph 235 in the form of a set of KG triples 312; (ii) obtain a set of embedding hyperparameters 318; (iii) access the KG embedding ML model 270 and/or the KG link prediction ML model 2750; (iv) train the KG embedding ML model 270 on the set of KG triples 312 to generate a set of KG vectors 345; (v) access the k-means clustering ML model 285 and a set of k-means hyperparameters 315; (vi) perform k-means clustering using the set of k-means hyperparameters 315 on the set of KG vectors 345 to obtain a set of KG vector clusters 348; and (vii) output the embedding clustering model 290.

The embedding clustering procedure 340 obtains the knowledge graph 235, which is represented as the set of KG triples 312.

The embedding clustering procedure 340 accesses the KG embedding ML model 270 and obtains the set of embedding hyperparameters 318. The embedding clustering procedure 340 trains the KG embedding ML model 270 using the set of embedding hyperparameters 318 on the set of KG triples 312 to generate the set of KG vectors 345.

The embedding clustering procedure 340 obtains the set of KG vectors 345. The set of KG vectors 345 represents the embedding of the set of KG triples 312 such that similar substructures in the knowledge graph 235 are close in the embedding space, i.e. a distance between two KG vectors are indicative of a similarity of the substructures.

It will be appreciated that in one or more other embodiments, the KG embedding ML model 270 may generate a vector which represent different substructures of the knowledge graph 235, i.e. a given vector may represent one of a node, edge, triple, and subgraph of the knowledge graph 235.

In one or more other embodiments, the embedding clustering procedure 340 obtains the set of KG vectors 345 from the database 230 or from another electronic device.

The embedding clustering procedure 340 accesses the k-means clustering ML model 285 and a set of k-means hyperparameters 315 to cluster the set of KG vectors 345 to obtain the set of KG vector clusters 348, where each KG vector cluster includes a respective subset of the set of KG vectors 345. K-means clustering is executed to minimize cluster inertia such that close nodes according to Euclidean distance (i.e. distance between their respective vectors) tend to belong to the same cluster. In one or more embodiments, the embedding clustering procedure 340 accesses the embedding clustering ML model 290 and a set of hyperparameters to perform the clustering and obtain the set of KG vector clusters 348.

Each KG vector cluster of the set of KG vector clusters 345 is indicative of a second type of similarity between KG vectors located in the same clusters (which correspond to nodes in the knowledge graph 235). The second type of similarity may be used to perform link predictions in the knowledge graph 235.

Figure 5:
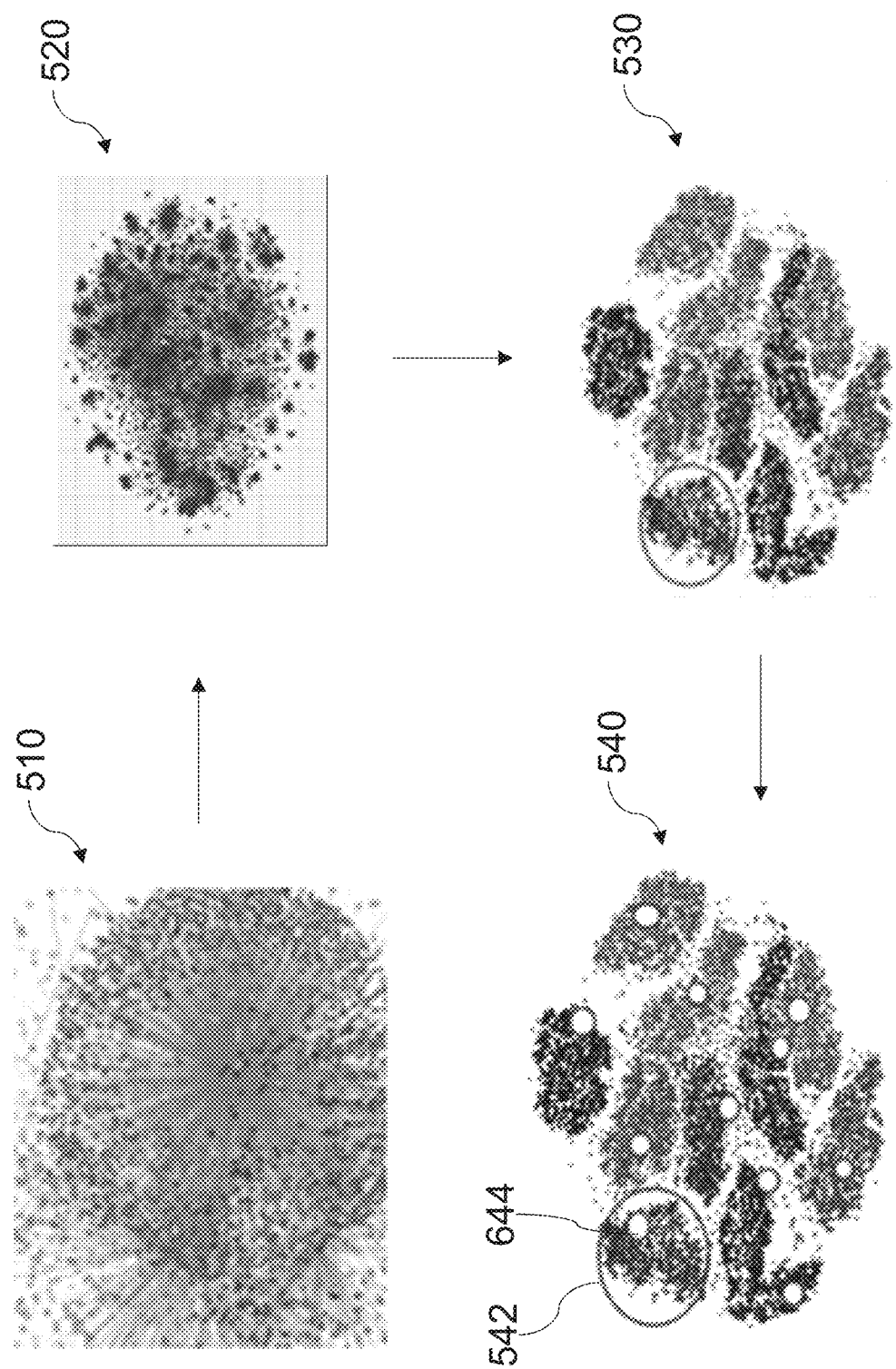
FIG. 5 depicts a knowledge graph, an embedding of the knowledge graph, a set of clusters generated from the embedding of the knowledge graph, and nodes removed from the clusters based on partial ontologies in accordance with one or more non-limiting embodiments of the present technology.

With brief reference to FIG. 5, there is depicted, in accordance with one or more non-limiting embodiments of the present technology, a non-limiting example of the set of KG triples 312 in the form of a schematic diagram of a plot of a set of KG triples 510. The KG embedding ML model 270 is executed on the set of KG triples 510 to obtain the set of KG vectors 520. The k-means clustering ML model 285 is executed on the set of KG vectors 520 to obtain the set of KG vector clusters 530.

Now referring back to FIG. 3, the embedding clustering procedure 340 outputs the set of KG vector clusters 630, where each KG vector cluster comprises a respective subset of KG vectors, and where each KG vector corresponds to an embedding of a node of the KG 235. In one or more embodiments, the embedding clustering procedure 340 outputs, for each KG vector cluster, a subset of nodes of the knowledge graph 234 corresponding to the respective KG vectors in the respective cluster.

It will be appreciated by the skilled addressee that the graph partitioning procedure 320 and the embedding clustering procedure 340 are independent from each other and may be executed in sequence or in parallel.

Combination Procedure

The combination procedure 360 is configured to inter alia: (i) obtain the set of partial ontologies 328; (ii) obtain the set of KG vector clusters 630; (iii) obtain the set of KG triples 312; (iv) generate, based on the set of partial ontologies 328 and the set of KG triples 312, a set of partial KG triples 365;

and (v) generate, based on the set of partial KG triples 365 and the set of KG vector clusters 360, a set of KG training triples 370.

The combination procedure 360 obtains the set of KG triples 312.

The combination procedure 360 obtains the set of partial ontologies 328 generated by the graph partitioning procedure 320. In one or more embodiments, the combination procedure 360 obtains the set of partial ontologies 328 from the database 230.

The combination procedure 360 obtains the set of KG vector clusters 630 generated by the embedding clustering procedure 340. In one or more embodiments, the combination procedure 360 obtains the set of KG vector clusters 630 from the database 230. Each KG vector cluster is associated with a respective subset of KG vectors, which correspond to a subgraph of the knowledge graph 235.

The combination procedure 360 generates, for each partial ontology of the set of partial ontologies 328, a respective partial KG triple subset from the set of KG triples 312. The combination procedure 360 thereby obtains, for the set of partial ontologies 328, a set of partial KG triples 365.

The combination procedure 360 determines, for each respective partial KG triple subset 367, a respective set of removed KG nodes associated with the respective removed ontology clusters (i.e. having been removed to generate the respective partial ontology). The combination procedure 360 selects, based on the corresponding KG vectors in the set of KG vectors, removed KG nodes which belong to the same clusters in the set of KG vector clusters 630, to thereby obtain a set of respective potential explanation KG nodes. In one or more embodiments, each potential explanation KG node in the set of respective potential explanation KG nodes is determined based on a distance being below a predetermined threshold. In one or more embodiments, each potential explanation KG node in the set of respective potential explanation KG nodes is a node related to the prediction that is within the predetermined distance threshold.

With brief reference to FIG. 5, there is depicted the set of KG vectors clusters with removed nodes 540, where each given cluster 542 has removed nodes 544 having been removed based on the partial ontology.

Now referring back to FIG. 3, the combination procedure 360 removes the potential explanation KG nodes from the set of KG triples 312 to obtain a first subset of KG training triples or training KG subgraph. The potential explanation KG nodes are considered to be potential explanations for predictions which are to be tested.

The combination procedure 360 repeats the procedure for each respective partial KG triple subset to obtain a set of KG training triples 370 or set of training subgraphs 370.

The combination procedure 360 outputs the set of KG training triples 370, each subset of KG training triples being associated with removed potential explanation KG nodes.

Explanation Procedure

The explanation procedure 380 is configured to inter alia: (i) obtain the set of KG training triples 370; (ii) access the KG embedding ML model 270 and the KG embedding clustering ML model 290; (iii) train the KG embedding ML model 270 or the KG embedding clustering ML model 290 on each subset of KG training triples 377; (iv) rank a performance in link-prediction of each of the KG link prediction ML model 275 or KG embedding clustering ML model 290 on the respective subset of KG training triples to obtain a ranked list of subsets of KG training triples 390; (v) provide, based on the performance in link-prediction, a set removed potential explanation KG nodes as explanations.

The explanation procedure 380 trains the KG link prediction ML model 275 on a first subset of KG training triples to perform link predictions. In one or more embodiments, the KG link prediction ML model 275 comprises the KG embedding ML model 270. Additionally or alternatively, the KG link prediction ML model 275 comprises the KG embedding clustering ML model 290. It will be appreciated that the KG embedding ML model 270, the KG link prediction ML model 275, the KG embedding clustering ML model 290 have already been trained on the "full" set of triples of the knowledge graph 235.

The explanation procedure 380 evaluates a respective performance of the KG link prediction ML model 275 (or the KG embedding clustering ML model 290) on the first subset of KG training triples to obtain a first performance indicator. The performance indicator may for example be a score or a probability that there is a link between two KG nodes.

It will be appreciated that depending on how each of the KG embedding ML model 270, the KG link prediction ML model 275, the embedding clustering ML model 290 is configured, the performance may be evaluated in various ways. In one or more embodiments, the performance on the first subset of KG training triples is evaluated based on a number of link predictions performed. Additionally or alternatively, the performance on the first training dataset first subset of KG training triples may be evaluated relative to the performance of the "full" training dataset, i.e. the whole knowledge graph 235. As a non-limiting example, on the knowledge graph 235 there may be 95% of good predictions, and on the first subset KG training triples there may be 85% of good predictions. Thus, the impact of the removed potential explanation KG nodes associated with the first subset of KG training triples may be determined to be 10%.

It will be appreciated that the explanation procedure 380 repeats the training with a respective version of the KG link prediction ML model 275 (KG embedding clustering ML model 290) and performs an evaluation of performance on KG link prediction for each subset of KG training triples 377.

The explanation procedure 380 ranks, based on the respective performance indicators, the respective the KG link prediction ML model 275 (or KG embedding clustering ML model 290) having been trained on the respective subsets of KG training triples 390. In one or more embodiments, the explanation procedure 380 compares and ranks the set of KG training triples 370 in an increasing order i.e. from lower performance indicator to highest performance indicator, to obtain a ranked list of subsets of KG training triples 390.

In one or more embodiments, the explanation procedure 380 ranks the respective the KG link prediction ML model 275 (or KG embedding clustering ML model 290) having been trained on the respective subsets of KG training triples based on a relevance score to obtain the ranked list of subsets of KG training triples 390. In one or more embodiments, the relevance score of the respective subsets of KG training triples is calculated based on a difference between the respective performance indicator of the respective the KG link prediction ML model 275 (or KG embedding clustering ML model 290) and the performance indicator of the KG link prediction ML model 275 (or KG embedding clustering ML model 290) on the full training dataset or knowledge graph 235. Each of the ranked list of subsets of KG training triples 390 is associated with a relevance score.

In one or more embodiments, the explanation procedure 380 selects one or more respective subsets of KG training triples in the ranked list of subsets of KG training triples 390 based on the performance score being above a predetermined threshold, or rank being below a threshold. The respective subsets are provided as potential explanations for the link predictions.

In one or more embodiments, the explanation procedure 380 provides the removed the respective removed ontology cluster (i.e. the ontology cluster having been removed from the ontology 305 to generate the respective partial ontology) as a potential explanation for the link prediction.

Thus, one or more embodiments of the present technology enable measuring the impact of the removal of nodes in a KG for performing the predictions, which enables determining nodes having the greatest impact on the prediction, which may provide a way to interpret the prediction and provide explain ability in the reasoning of the machine learning model. This may enable fine-tuning the machine-learning algorithm as well as perform feature engineering in datasets, for example by keeping features which have the highest impact for a given prediction task and removing features having an impact below predetermined a threshold, which may save processing time, processing power, and storage space.

The explanation procedure 380 provides one or more of the ranked list of subsets of KG training triples 390 as a potential explanation for a given link prediction.

Method Description

FIG. 6 depicts a flowchart of a method 600, the method 600 being executed in accordance with one or more non-limiting embodiments of the present technology.

The server 220 has access to the set of MLAs 260 including KG embedding ML model 270, the KG link prediction ML model 275, the spectral clustering ML model 280, the k-means clustering ML model 285, and the embedding clustering ML model 290.

In one or more embodiments, the server 220 comprises a processing device such as the processor 110 and/or the GPU 111 and a non-transitory computer readable storage medium such as the solid-state drive 120 and/or the random-access memory 130 storing computer-readable instructions. The processor 110, upon executing the computer-readable instructions, is configured to execute the method 600.

The method 600 starts at processing step 602.

According to processing step 602, the server 220 obtains an ontology 305 representative of a structure of the knowledge graph 235, the ontology 305 comprising a set of ontology nodes and a set of ontology edges having been used to generate the knowledge graph 235.

According to processing step 604, the server 220 clusters, using the spectral clustering ML model 280, the ontology 305 to obtain a set of ontology clusters 325, each ontology cluster comprising a respective subset of ontology nodes and a respective subset of ontology edges. In one or more embodiments, the server 220 generates the set of partial ontologies 328 based on the set of ontology clusters 325. The server 220 generates each partial ontology in the set of partial ontologies 328 by removing, from the set of ontology clusters 325, one or more ontology clusters.

According to processing step 606, the server 220 obtains a set of KG vectors having been generated using the KG embedding ML model 270 on the knowledge graph 235 and being representative of the knowledge graph 235 in an embedding space. In one or more embodiments, the server 220 generates the set of KG vectors using a KG embedding ML model 270 to obtain the set of KG vectors 345.

According to processing step 608, the server 220 trains the k-means clustering ML model 285 on the set of KG vectors 345 and the knowledge graph 235 to obtain the set of KG vector clusters 630 based on a distance between vectors in the set of KG vectors 345, each vector cluster comprising a respective subset of vectors According to processing step 610, the server 220 generates based on the knowledge graph 235 and the set of ontology clusters 325, a respective training subgraph by removing nodes associated with a given partial ontology of the set of partial ontologies 328. The server 220 generates, for each partial ontology of the set of partial ontologies 328, a respective partial KG triple subset from the set of KG triples 312. The server 220 determines, for each respective partial KG triple subset 367, a respective set of removed KG nodes associated with the respective removed ontology clusters from the respective partial ontology. The server 220 removes the potential explanation KG nodes, corresponding to the set of removed KG nodes, from the set of KG triples 312 to obtain a first subset of KG training triples or training KG subgraph 377. The combination procedure 360 repeats the procedure for each respective partial KG triple subset to obtain a set of KG training triples 370 or set of training subgraphs 370.

According to processing step 612, the server 220 trains each respective KG embedding ML model 270 and/or the embedding clustering ML model 290 on the subset of KG training triples to generate embeddings.

In one or more embodiments, the server 220 accesses the KG link prediction ML model 275 to perform predictions on the subset of KG training triples 377. The server 220 repeats the training on each subset of KG training triples and performs link prediction using the KG link prediction ML model 275.

According to processing step 614, the server 220 compares a respective link prediction of each respective KG link prediction ML model 275 (the respective embedding clustering ML model 290) having been trained on the respective subset of KG training triples and a corresponding link prediction of the KG link prediction ML model 275 (the respective embedding clustering ML model 290) trained on the full knowledge graph 235 to obtain a ranked list of models (each model having been trained on a respective subsets of KG training triples 377) and obtains a ranked list of subsets of KG training triples 390.

According to step 616, the server 220 determines, based on ranked list of subsets of KG training triples 390, a relevance score of each removed potential explanation KG nodes for providing the respective link prediction in the knowledge graph 235.

In one or more embodiments, if a given removed subset of removed nodes (i.e. subset of potential explanation KG nodes) has a relevance above a predetermined threshold the server 220 provides the given subset of removed nodes as a potential explanation for the respective link prediction. In one or more embodiments, the removed ontology associated with the given subset of removed nodes is provided as a potential explanation for the link prediction(s).

The method 600 then ends.

It will be appreciated that at least one or more embodiments of the present technology aim to expand a range of technical solutions for addressing a particular technical problem, namely improving performance of deep neural networks used for link prediction in knowledge graphs by providing a potential explanation to the link prediction by identifying subgraphs whose removal has an impact on the predictions, which enables interpretability of the predicted links, which may in turn enable tuning a deep neural network to be less prone to errors and enable saving computational resources.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for evaluating a relevance score of a given subset of nodes in a knowledge graph for purpose of providing explanations for link prediction between at least two nodes in the knowledge graph, the method being executed by a processor, the processor having access to:
    a first clustering model,
    a second clustering model, and
    an embedding model having been trained for providing link prediction in the knowledge graph by evaluating a distance between vectors generated from the knowledge graph,
    the method comprising:
    obtaining an ontology representative of a structure of the knowledge graph, the ontology comprising a set of ontology nodes and a set of ontology edges having been used to generate the knowledge graph;
    clustering, using the first clustering model, the ontology to obtain a set of ontology clusters, each ontology cluster comprising a respective subset of ontology nodes and a respective subset of ontology edges;
    obtaining a set of vectors having been generated using the embedding model on the knowledge graph and being representative of the knowledge graph in an embedding space;
    training the second clustering model on the set of vectors and the knowledge graph to obtain a set of vector clusters based on a distance between vectors in the set of vectors, each vector cluster comprising a respective subset of vectors;
    generating, based on the knowledge graph and the set of ontology clusters, a respective training subgraph by removing, from the knowledge graph, a respective subset of nodes associated with a respective ontology cluster from the set of ontology clusters;
    training a respective embedding model on the respective training subgraph for providing a link prediction between at least two nodes in the respective training subgraph;
    comparing a respective link prediction of each respective trained embedding model and a corresponding link prediction of the trained second clustering model to obtain a ranked list of trained embedding models; and
    determining, based on the ranked list of trained embedding models, a relevance score of each removed respective subset of nodes for providing the respective link prediction in the knowledge graph;
    if a given removed subset of nodes has a relevance score above a predetermined threshold:
        providing the given removed subset of nodes as an explanation for the respective link prediction, wherein the explanation is one or more of content recommendation to users, explanations for optimal fuel consumption, or explanations in pathology detection in images acquired using medical imaging modalities.

2. The method of claim 1, wherein
    each ontology cluster in the set of ontology clusters is indicative of a first type of similarity between nodes in the knowledge graph associated with the ontology cluster; and
    each vector cluster in the set of vector clusters is indicative of a second type of similarity between nodes in the knowledge graph associated with the vector cluster.

3. The method of claim 1, wherein the clustering of the ontology comprises:
    clustering the ontology to obtain a set of spectral clusters; and
    clustering the set of spectral clusters to obtain the set of ontology clusters.

4. The method of claim 3, wherein the first clustering model comprises a spectral clustering model used for obtaining the set of spectral clusters and a k-means clustering model used for obtaining the set of ontology clusters.

5. The method of claim 3, wherein the second clustering model comprises another k-means clustering model.

6. The method of claim 4, wherein
    the method further comprises, prior to the training of the second clustering model:
        obtaining a set of hyperparameters of the embedding model; and wherein
    the training of the second clustering model is performed using the set of hyperparameters of the embedding model.

7. The method of claim 1, wherein
    the knowledge graph is represented as a set of triples; and wherein
    the ontology is represented as a set of ontology triples.

8. The method of claim 7, further comprising, prior to the obtaining of the set of vectors:
    obtaining the set of triples; and
    generating, using the set of triples, the set of vectors.

9. The method of claim 8, wherein the generating of the respective training subgraph comprises generating, from the set of triples, a respective set of training triples.

10. A system for evaluating a relevance score of a given subset of nodes in a knowledge graph for purpose of providing explanations for link prediction between at least two nodes in the knowledge graph, the system comprising a processor, the processor having access to:
    a first clustering model,
    a second clustering model, and
    an embedding model having been trained for providing link prediction in the knowledge graph by evaluating a distance between vectors generated from the knowledge graph,
    the processor being operatively connected to a non-transitory storage medium comprising instructions, the processor, upon executing the instructions, being configured for:

obtaining an ontology representative of a structure of the knowledge graph, the ontology comprising a set of ontology nodes and a set of ontology edges having been used to generate the knowledge graph;

clustering, using the first clustering model, the ontology to obtain a set of ontology clusters, each ontology cluster comprising a respective subset of ontology nodes and a respective subset of ontology edges;

obtaining a set of vectors having been generated using the embedding model on the knowledge graph and being representative of the knowledge graph in an embedding space;

training the second clustering model on the set of vectors and the knowledge graph to obtain a set of vector clusters based on a distance between vectors in the set of vectors, each vector cluster comprising a respective subset of vectors;

generating, based on the knowledge graph and the set of ontology clusters, a respective training subgraph by removing, from the knowledge graph, a respective subset of nodes associated with a respective ontology cluster from the set of ontology clusters;

training a respective embedding model on the respective training subgraph for providing a link prediction between at least two nodes in the respective training subgraph;

comparing a respective link prediction of each respective trained embedding model and a corresponding link prediction of the trained second clustering model to obtain a ranked list of trained embedding models; and determining, based on the ranked list of trained embedding models, a relevance score of each removed respective subset of nodes for providing the respective link prediction in the knowledge graph;

if a given removed subset of nodes has a relevance score above a predetermined threshold:
providing the given removed subset of nodes as an explanation for the respective link prediction, wherein the explanation is one or more of content recommendation to users, explanations for optimal fuel consumption, or explanations in pathology detection in images acquired using medical imaging modalities.

11. The system of claim 10, wherein
each ontology cluster in the set of ontology clusters is indicative of a first type of similarity between nodes in the knowledge graph associated with the ontology cluster; and
each vector cluster in the set of vector clusters is indicative of a second type of similarity between nodes in the knowledge graph associated with the vector cluster.

12. The system of claim 11, wherein the clustering of the ontology comprises:
clustering the ontology to obtain a set of spectral clusters; and
clustering the set of spectral clusters to obtain the set of ontology clusters.

13. The system of claim 12, wherein the first clustering model comprises a spectral clustering model used for obtaining the set of spectral clusters and a k-means clustering model used for obtaining the set of ontology clusters.

14. The system of claim 13, wherein the second clustering model comprises another k-means clustering model.

15. The system of claim 14, wherein
the processor is further configured for, prior to the training of the second clustering model:
obtaining a set of hyperparameters of the embedding model; and wherein
the training of the second clustering model is performed using the set of hyperparameters of the embedding model.

16. The system of claim 10, wherein
the knowledge graph is represented as a set of triples; and wherein
the ontology is represented as a set of ontology triples.

17. The system of claim 16, wherein the processor is further configured for, prior to the obtaining of the set of vectors:
obtaining the set of triples; and
generating, using the set of triples, the set of vectors.

18. The system of claim 17, wherein the generating of the respective training subgraph comprises generating, from the set of triples, a respective set of training triples.

* * * * *